United States Patent [19]
Corao

[11] 4,053,677
[45] Oct. 11, 1977

[54] LIGHT CONCRETE MONOLITHIC SLAB

[76] Inventor: Manuel J. Corao, Apartado Postale 4940, Caracas, Venezuela

[21] Appl. No.: 569,333

[22] Filed: Apr. 17, 1975

[51] Int. Cl.$^2$ .................. B32B 3/26; B32B 13/00
[52] U.S. Cl. .................. 428/310; 428/313; 428/320; 52/309.4; 52/309.12
[58] Field of Search ............ 428/310, 315, 313, 320, 428/321, 322; 52/309

[56] References Cited

U.S. PATENT DOCUMENTS

| | | | |
|---|---|---|---|
| 2,776,914 | 1/1957 | Faulwetter | 106/81 |
| 2,850,890 | 9/1958 | Rubenstein | 52/229 |
| 3,247,294 | 4/1966 | Sabouni | 264/42 |
| 3,595,947 | 7/1971 | Wielinge | 428/322 |
| 3,607,605 | 9/1971 | Suzukawa | 428/310 |
| 3,608,003 | 9/1971 | Klaue et al. | 428/322 |
| 3,661,604 | 5/1972 | Artman | 106/98 |
| 3,750,355 | 8/1973 | Blum | 52/309 |
| 3,753,849 | 8/1973 | Duff | 428/414 |
| 3,764,357 | 10/1973 | Bowies et al. | 260/2.5 B |
| 3,775,351 | 11/1973 | Sachs | 260/2.5 L |
| 3,808,085 | 4/1974 | Givens, Jr. | 52/34 |
| 3,922,413 | 11/1975 | Reineman | 428/310 |
| 3,953,629 | 4/1976 | Wesch | 428/320 |

FOREIGN PATENT DOCUMENTS 1,030,333  5/1966  United Kingdom

OTHER PUBLICATIONS

Offenlegungsschrift 2,023,609 (12/1971) Bosch, 1 sht. dwg., 7 pp. spec.

Primary Examiner—William J. Van Balen
Attorney, Agent, or Firm—John J. Byrne; Edward E. Dyson

[57] ABSTRACT

A monolithic slab manufactured from light, generally foamy concrete between two layers of reinforced concrete, having smooth, or alternatively corrugated, exterior surfaces, to suit the particular utilization requirements thereof.

7 Claims, 2 Drawing Figures

LIGHT CONCRETE MONOLITHIC SLAB

A principal object of this invention is to provide a building slab, primarily of concrete, which is relatively light in weight, economical in manufacture and which has relatively high attributes of tensile and compressive strengths. Although lightweight slabs per se are not new to the building trades, the construction of the slab of the instant invention provides certain strengths, economies and benefits, such as an improved ability to be used as bearing walls, that have been heretofore unknown to the prior art.

The slab of the present invention is characterized by its quality of insulation, lightness and sturdiness. The slab of this invention eliminates the need for plastering and refacing. In view of its lightness, placement thereof on walls or roofs does not entail the use of cranes or heavy machinery. This results in a reduction in the cost of construction. The mounting of the slabs does not require skilled labor.

A further objective of this invention is to provide a strong panel by utilizing reinforcing rods or wire-mesh and protecting them within a special concrete layer, thus precluding oxidation thereof which oftentimes occurs in the metal elements in lightweight concrete slabs of the prior art.

Another objective of this invention is to provide a slab having the benefits of many types of construction. By virtue of its light, foamy concrete interior, the slab has improved insulation and lightness characteristics. By virtue of its reinforced outer layer it is given strength.

Essentially, the slab of this invention is composed of two reinforced-concrete layers having pre-embedded wire-mesh under tension that does not project therefrom and between these layers is sandwiched a nucleus or light foam concrete layer.

between each of the outside layers and the internal, light concrete layer a layer or film of granite or terrazo is sprinkled for adhesive purposes. This granite-sprinkled layer or film is a mixture of granite and 50% cement.

Interspersed on the sprinkled film, layers of glass fiber with an emulsified cement can be used. The film is made of a similar cement and may have a smooth external finish for the ultimate use that it is to be given. The surface can be plaster-like or alternatively have low or high relief protuberances. The interspersed layers provide an improved bonding action between the reinforced layer and the light material foam layer.

In order to obtain the corrugation effect on outside surfaces, a plastic canvas web or mold during manufacture of the slab is used to thus ensure the preferred pattern with which to accomplish the plaster work.

Another advantage of the invention is that a number of layers are quite readily fabricated in a continuous fashion with no wastage of time for insertion between the three main layers. Manufacture is accomplished series-wise by a conveyor belt.

These and other objects of the invention will become more apparent to those skilled in the art by reference to the following detailed description when viewed in light of the accompanying drawings wherein.

Figure 1:
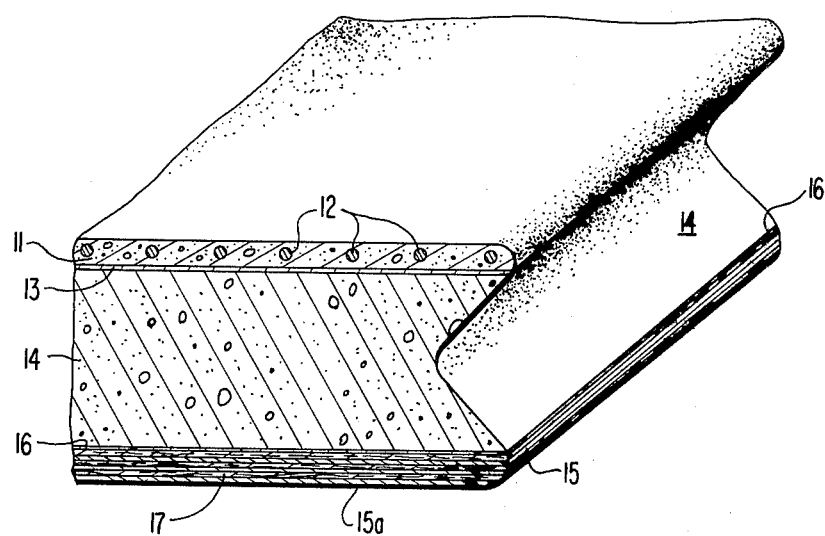
FIG. 1 is a partial perspective of a building slab of this invention.
Figure 2:
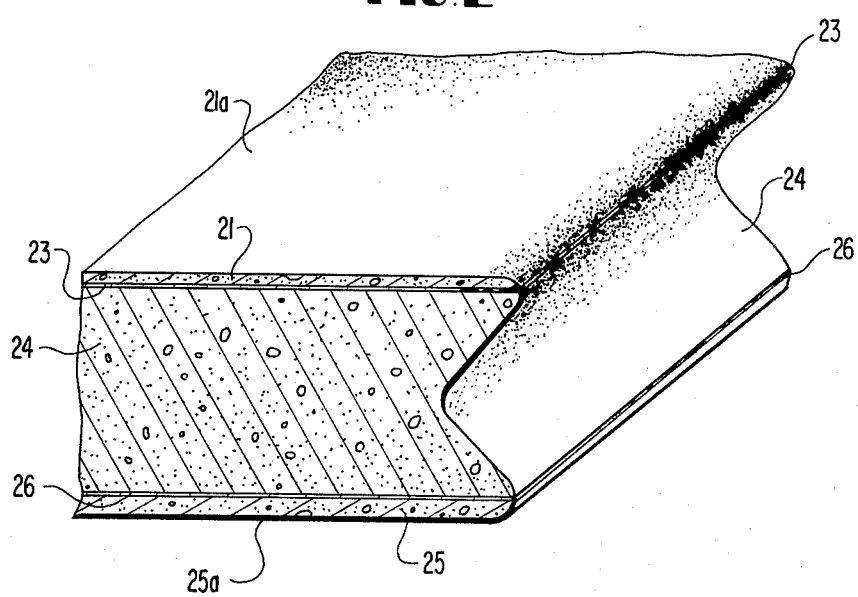
FIG. 2 is a partial perspective of a different embodiment of the invention in FIG. 1.

The presently preferred embodiments of the invention are depicted in FIGS. 1 and 2 of the drawings in which parts are distributed, by way of an example, in conformity with the particular ways devised for the practical application of the basic principles.

Referring now to the aforesaid drawings, FIGS. 1 and 2 show the perspective of two portions of slab compositions, one being in its simplest conception and the second being a slightly modified materialization. In FIG. 1, a first exterior layer 11 is special concrete, having a thickness that ranges from 3mm. – 6 mm. and embedded therein is a wire mesh or reinforcing bars 12 as desired. A sprinkled "inbetween" layer or film 13 bonds the aforesaid special concrete layer 11 to an insulating light concrete layer 14. The thickness of layer 14 will vary according to construction requirements. In many instances, it is five to six times thicker than layer 11. An overlaying coat 15 of special concrete covers a sprinkled film 16. The coat 15 has a preferred thickness of from 3 mm. to 6 mm. and may be constituted by an interspersing of glass fiber layers 17. A last or outer surface 15a is of concrete, and which, just as the one on the opposite surface 11a can be sprinkled or smoothed to any preferred surface and color.

In FIG. 2 there is shown a light slab composed as the previous one, by a layer or central kern 24 of isolating light concrete 24, which on its outside surfaces, and overlaying sprinkled films 23 and 26, is coated with special concrete layers 21 and 25. The outside facings thereof 21a and 25a can be similarly finished as the slab previously described and depicted in FIG. 1.

The special concrete or external layers are a mixture of selected sand, mainly consisting of silicous sand and quartz, with Portland cement, in a proportion of five parts of sand to two parts of cement. To this mixture there is added water and a synthetic emulsified resin in the proportion of 3.78 liters of the latter to 200 liters of water. A liquid additive with sufficient viscostity to provide for adequate setting properties is also added.

The central or light concrete layer can be manufactured with particles of plastic material, preferably weighing 10 – 15 gs. per cubic meter. This quantity is subsequently impregnated or bathed in an admixture of water and synthetic resin in the proportion of 2.5 liters of resin to every 20 liters of water. Each cubic meter of the particles as prepared is to be mixed with 450 kgs. of cement and 180 liters of water, which, once it has properly set, will provide light concrete.

For glass fiber interspersing in the outside surface or layer desired to be overlain with engravings in highs or bas-relief (such as, for example, for use on ceilings), there is used an admixture consisting of 20 liters of water to 42.5 kgs. of cement and 350 grs. of emulsified synthetic resin.

The glass fibers can be approximately 0.5 to 3 inches in length.

In a general manner, while there have been disclosed effective and efficient embodiments of the invention, it should be well understood that the invention is not limited to such embodiments, as there might be changes made in the arrangement, disposition, and form of the parts without departing from the principle of the present invention as comprehended within the scope of the accompanying claims.

I claim:

1. A building slab comprising:
    a first layer of solid, lightweight, foamed concrete, said first layer having first and second surfaces;

a second layer of regular weight concrete coextensive with said first surface, disposed on said first surface, and having a thickness substantially less than said first layer;

metal reinforcing members embedded in said second layer;

a third layer of regular weight concrete coextensive with said second surface, disposed on said second surface, and having a thickness substantially less than said first layer; and an adhesive film composed of a mixture of granite, cement, and glass fibers interspersed between said first and second layers and between said first and third layers.

2. The slab of claim 1 wherein glass fibers are interspersed in said third layer.

3. The slab of claim 1 wherein said first layer is concrete mixed with a resin-bathed plastic filler.

4. A building slab of claim 1 wherein said metal reinforcing members are metal bars.

5. A building slab of claim 1 wherein said metal reinforcing members are a wire mesh network.

6. The building slab of claim 1 wherein said metal reinforcing members are metallic members under tension.

7. The building slab of claim 1 wherein said second and third layers are a mixture of silicous and quartz sand, Portland cement in a proportion five-to-two, and water mixed with an emulsified synthetic resin in the proportion of approximately one part resin to twenty parts water.

* * * * *